US009744615B2

(12) United States Patent
Jones et al.

(10) Patent No.: US 9,744,615 B2
(45) Date of Patent: Aug. 29, 2017

(54) METHOD AND SYSTEM FOR STUD WELDING

(75) Inventors: Jerald Edward Jones, Golden, CO (US); Valerie L. Rhoades, Golden, CO (US); Todd Earl Holverson, Appleton, WI (US); Adam N. Cuneo, Golden, CO (US); Stephen K. Madden, Lexington, OH (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 1241 days.

(21) Appl. No.: 13/542,094

(22) Filed: Jul. 5, 2012

(65) Prior Publication Data

US 2013/0015163 A1     Jan. 17, 2013

Related U.S. Application Data

(60) Provisional application No. 61/508,431, filed on Jul. 15, 2011.

(51) Int. Cl.
*B23K 9/20* (2006.01)
*B23K 9/10* (2006.01)

(52) U.S. Cl.
CPC .............. *B23K 9/20* (2013.01); *B23K 9/1006* (2013.01); *B23K 9/206* (2013.01)

(58) Field of Classification Search
CPC .......... B23K 9/202; B23K 9/201; B23K 9/20; B23K 9/1006; B23K 9/095
See application file for complete search history.

(56) References Cited

U.S. PATENT DOCUMENTS

| | | | | | |
|---|---|---|---|---|---|
| 3,242,307 | A | * | 3/1966 | Mowry et al. | 219/99 |
| 3,582,602 | A | * | 6/1971 | Ettinger | B23K 9/206 |
| | | | | | 219/98 |
| 4,241,285 | A | * | 12/1980 | Golonka et al. | 219/98 |
| 4,439,661 | A | * | 3/1984 | Doyle et al. | 219/99 |
| 4,456,808 | A | * | 6/1984 | Wilkinson et al. | 219/98 |

(Continued)

FOREIGN PATENT DOCUMENTS

| DE | 202006004309 | | 5/2006 |
|---|---|---|---|
| DE | 102008054455 | A * | 6/2010 |

(Continued)

OTHER PUBLICATIONS

Machine translation of German Patent Document DE-102008054455-A, Aug. 2015.*

(Continued)

*Primary Examiner* — Geoffrey S Evans
(74) *Attorney, Agent, or Firm* — Fletcher Yoder P.C.

(57) ABSTRACT

A stud welding process may be performed by a power supply that is adapted for other welding processes, such as MIG, TIG, and so forth. A stud welding gun may receive studs preloaded in a magazine or other support. Studs are charged into the chuck of a stud welding gun and positioned where desired over a surface. An extension, such as a wire-type electrode may extend from the stud and aid in establishing the welding arc. The stud may be shielded by a nozzle or other shield to obviate the need for ceramic ferrules. Orientation of the stud welding gun may be detected, displayed and used as a basis for initiating and completing the stud welding process once the gun and/or stud is properly positioned.

25 Claims, 4 Drawing Sheets

(56) References Cited

U.S. PATENT DOCUMENTS

| | | | |
|---|---|---|---|
| 4,868,366 A * | 9/1989 | Joseph et al. | 219/137.71 |
| 5,406,044 A * | 4/1995 | Killian et al. | 219/99 |
| 5,662,820 A | 9/1997 | Schwiete | |
| 6,163,005 A | 12/2000 | Easterday | |
| 6,175,094 B1 | 1/2001 | Easterday | |
| 6,326,591 B1 | 12/2001 | Hutchinson | |
| 6,476,339 B2 | 11/2002 | Easterday | |
| 7,138,602 B2 | 11/2006 | Huismann | |
| 7,521,647 B2 * | 4/2009 | Schug et al. | 219/98 |
| 7,893,382 B2 | 2/2011 | Moran | |
| 2003/0019847 A1 | 1/2003 | Schmitt | |
| 2003/0164357 A1 * | 9/2003 | Hedberg | 219/98 |
| 2004/0169017 A1 | 9/2004 | Sakoda | |
| 2006/0131280 A1 * | 6/2006 | Schmitt | B23K 9/20 219/98 |
| 2007/0056934 A1 * | 3/2007 | Hsu | 219/98 |
| 2007/0199277 A1 * | 8/2007 | Martin | 52/750 |
| 2007/0295699 A1 * | 12/2007 | Ulrich et al. | 219/98 |
| 2008/0073330 A1 * | 3/2008 | Diedrick et al. | 219/133 |
| 2008/0142491 A1 * | 6/2008 | Citrich et al. | 219/98 |
| 2010/0224610 A1 * | 9/2010 | Wallace | 219/137 R |

FOREIGN PATENT DOCUMENTS

| | | | |
|---|---|---|---|
| GB | 692553 | | 6/1953 |
| GB | 1395632 | * | 5/1975 |
| JP | 56-66386 A | * | 6/1981 |
| JP | 3-198983 A | * | 8/1991 |
| JP | 11-226731 A | * | 8/1999 |
| JP | 2002-172465 A | * | 6/2002 |
| WO | 0151241 | | 7/2001 |

OTHER PUBLICATIONS

Lyman et al. , Metals Handbook, 8th edtion, vol. 6, "Welding and Brazing", American Society for Metals, Dec. 1971, pp. 167-186.*

Machine translation of Japan Patent document No. 11-226,731, Mar. 2016.*

Machine translation of Japan Patent document No. 2002-172,465, Mar. 2016.*

PCT International Search Report & Written Opinion of PCT/US2012/046743 dated Mar. 13, 2013, 22 pages.

"ARC/SC: Drawn arc/Short cycle stud welding," HBS, http://www.hbs-studwelding.com/uploads/tx_hbsproducts/HBS-Brochure_ARC_SC-engl_Efft_100920_01.pdf; accessed Dec. 18, 2015.

"Arc Sentry Arc Welding Monitoring System," Native American Technologies, Inc., http://www.natech-inc.com/products.htm; accessed Dec. 18, 2015.

"Catalog," Nelson Stud Welding, Doncasters Group Limited Company, 2010, www.nelsonstud.com/Portal/Products/Fasteners/Catalog/tabid/58/Default.aspx; accessed Dec. 21, 2015.

"Nelson NCD 60, 100, 150 Capacitor Discharge Systems," Nelson Stud Welding, http://www.nelsonstud.com/Portal/Portals/0/pdf/NCD%2060-100-150.pdf; accessed Dec. 21, 2015.

"Processes," Nelson Stud Welding, Doncasters Group Limited Company, 2010, www.nelsonstud.com/Portal/OpeatingPolicy/Processes/tabid/76/Default.aspx; accessed Dec. 21, 2015.

Drawn-arc stud welding with shielding gas, Koster & Co, http://www.bolzenschweisstechnik.de/en/anwendungen/stud-welding-processes/stud-welding-with-shielding-gas/; accessed Dec. 18, 2015.

Drawn Arc Stud Welding Process, Image Industries Inc., www.imageindustries.com/stud_welding_processes/arc_stud_welding_process.asp; accessed Dec. 18, 2015.

Nelson Stud Welding, Doncasters Group Limited Company, 2010 www.nelsonstud.com/portal/; accessed Dec. 18, 2015.

Stud Welding Equipment and Supplies, Sunbelt Stud Welding Inc., http://www.sunbeltstudwelding.com/studwelding.htm; accessed Dec. 18, 2015.

* cited by examiner

METHOD AND SYSTEM FOR STUD WELDING

CROSS REFERENCE TO RELATED APPLICATIONS

This application is a Non-Provisional Patent Application of U.S. Provisional Patent Application No. 61/508,431, entitled "Stud Welding System, Consumables, and Method", filed on Jul. 15, 2011, which is herein incorporated by reference.

BACKGROUND

The present invention relates generally to stud welding, and more particularly to a novel stud welding process, new stud welding consumables, and methods for stud welding.

A range of welding operations are known and are currently in use for various specific applications. Among these, stud welding is commonly used to place studs on a mounting surface by application of electric current that fuses the stud to the surface. These techniques are used in a wide range of applications, such as for construction, ship building, and so forth. In many applications great numbers of studs will be placed in this manner for mounting of components to the support surface in subsequent operations. While significant advances have occurred in other welding techniques and processes, stud welding has remained somewhat unchanged for a considerable time. In general, stud welders place a pre-prepared stud with a ceramic ferrule in a chuck of a stud welding gun, the gun being coupled to a specialized power supply. The power supplies used in stud welding typically are capable of very high current flows to accomplish the weld in a short duration. Accordingly, the power supplies are not used for other purposes than stud welding, limiting their applicability. The stud is positioned at a desired location, and current is initiated between the stud and the workpiece surface, surrounded by the ferrule. High current flows, and the stud is plunged into place to secure it to the workpiece surface through fusion of the stud and workpiece surface materials. The ferrule is then broken from around the stud and the surface is cleaned.

A number of drawbacks are associated with these conventional stud welding techniques. Firstly, as mention above, the power supplies are not able to be used for other welding purposes. Moreover, placement of studs, and assurance of perpendicularity with the underlying surface is extremely time-consuming, often requiring hours or days of marking and careful placement. Moreover, the use of ceramic ferrules leads to significant costs in cleanup of the weld and weld area. Still further, conventional stud welding guns can be extremely bulky and unwieldy, requiring significant effort for their movement, placement and use.

There is a need, therefore, for improved stud welding techniques that might respond to some or all of these drawbacks.

BRIEF DESCRIPTION

The present invention provides a stud welding system, method and consumables designed to respond to such needs. The technique may make use of a power supply that employs a much lower current for stud welding, and that may thus be able to perform a wide range of other welding processes. Moreover, certain aspects of these other welding processes may be used to enhance the stud welding operation, providing improved performance and an improved weld. The use of a lower current may significantly reduce the size and weight of conductors to be used to tie the power supply to the stud welding gun. The invention also contemplates control of the orientation of the stud welding gun or at least feedback to a welding operator of the relative position to obtain good perpendicularity of the stud with the workpiece surface. In certain embodiments, the stud may be placed and the welding operation continued automatically once the appropriate orientation is obtained. The invention also contemplates studs of different configurations then those of the prior art. For example, studs may include a wire or standoff that properly positions the stud with respect to the workpiece surface and that aids in initiation of the welding arc. The studs may be pre-loaded on a support, similar to conventional nail gun loads for ease of use in the stud welding gun. Still further, the standoff or bridge wire at the base of the studs may comprise a metallurgy that facilitates metallurgical alloying of the stud with the workpiece, thereby allowing different materials to be used for the stud itself as compared to the workpiece material. These and other features of the invention are described in detail below.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
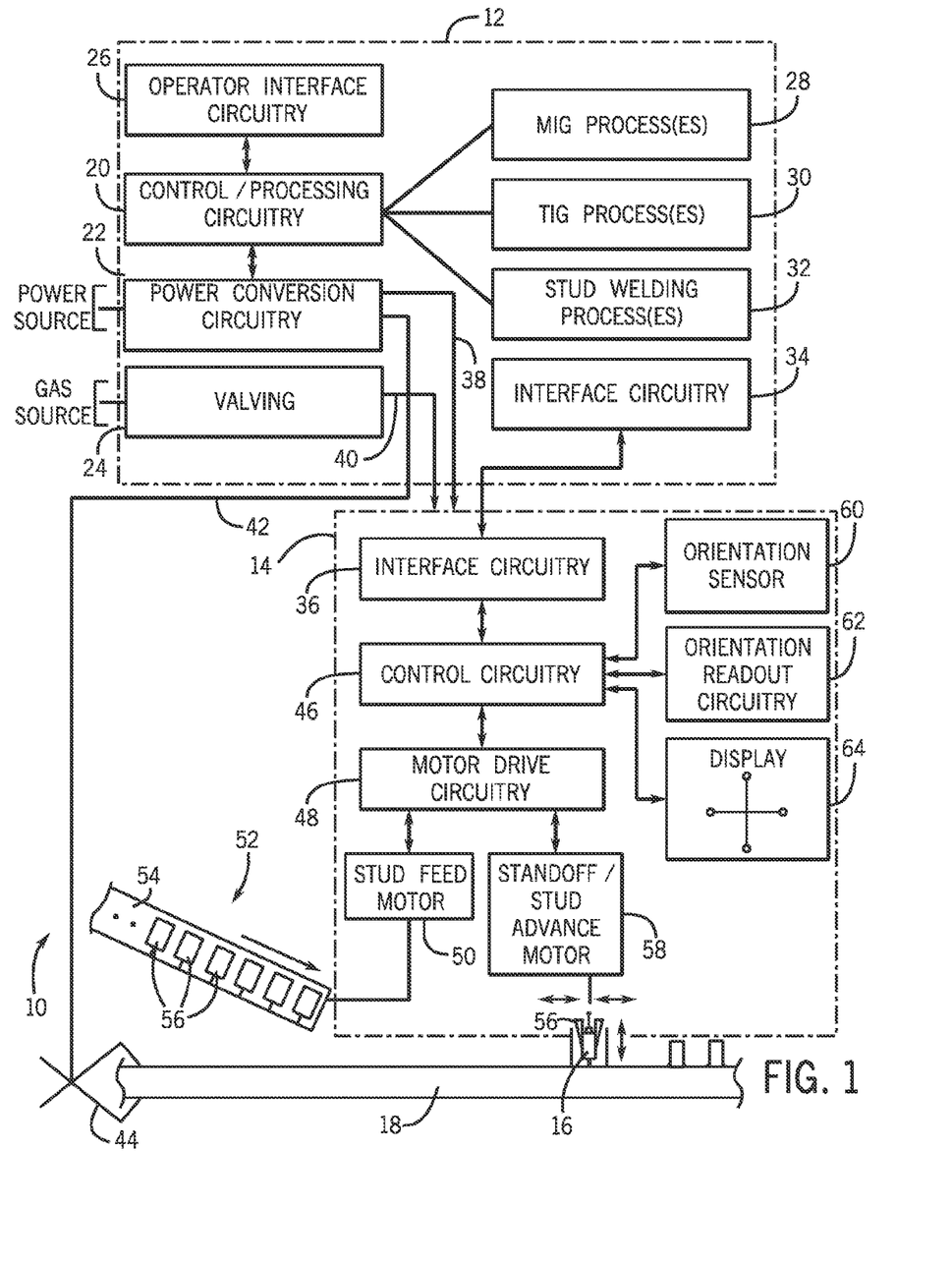
FIG. 1 is a diagrammatical representation of a stud welding system in accordance with aspects of the present disclosure.

Turning now to the drawings, FIG. 1 represents an exemplary stud welding system 10 incorporating aspects of the present disclosure. The system includes a welding power supply 12 and a stud welding gun 14 coupled to the power supply, both intended to permit studs 16 to be welded to a workpiece 18. In the illustrated embodiment, the power supply 12 is adapted not only for stud welding but for a range of other welding processes. It comprises control/processing circuitry 20 and power conversion circuitry 22 that cooperate to provide output power in accordance with the selected welding processes. The control/processing circuitry 20 will typically include one or more microprocessors, digital signal processors, or the like and associated memory (not separately represented). The processing circuitry carries out welding processes of generally known types, and may also perform stud welding processes. Under the control of the control/processing circuitry 20, the power conversion circuitry, which is coupled to a power source such as the power grid, engine-driven generator, or any other suitable source, converts incoming power to welding power satisfactory for the particular welding process involved. The power conversion circuitry will typically include power electronic devices, such as SCRs, IGBTs, transformers, and any other suitable circuitry for performing the power conversion. The particular topology of the power conversion circuitry may follow any known designs, including power converters, power inverters, buck converters, boost converters, and so forth.

Valving 24 is provided for controlling the flow of shielding gasses, which may be used in certain of the welding processes, including stud welding. The valving, such may be provided in the power supply or in a remote module, will be coupled to a source of shielding gas and may be operated under the control of the control/processing circuitry 20 for initiating and interrupting the flow of shielding gas to the application. Operator interface circuitry 26 is also provided that is linked to the control/processing circuitry 20 either directly or indirectly. The operation interface circuitry allows an operator to select a welding process, set welding parameters, review of welding parameters and settings, and so forth. The operator interface circuitry 26 will typically be associated with a control panel on an exterior surface of the power supply, that will also typically include any displays, buttons, dials, and so forth in a conventional manner. It should be noted, however, that an operator interface may be provided on the power supply, on the stud welding gun, or on any other device coupled to these.

As noted above, the power supply 12 is adapted for a number of different welding operations, in contrast to typical stud welding power supplies. In the illustrated embodiment, programming is stored in the power supply and available to the control/processing circuitry 20 for performing any one or more of several conventional welding processes. These may include gas metal arc welding (GMAW, commonly referred to as metal inert gas (MIG) welding), flux-cored arc welding (FCAW), shielded metal arc welding (SMAW, commonly referred to as stick welding), gas tungsten arc welding (GTAW, commonly referred to as tungsten inert gas welding (TIG)), carbon arc gouging, and so forth. as indicated by reference numerals 28 and 30, and stud welding processes, as indicated by reference numeral 32. As will be appreciated by those skilled in the art, many such processes are known and may be available on the power supply. MIG processes will typically include control of power applied to a MIG welding torch along with the control of the feed of a welding wire electrode and shielding gas. TIG processes will typically include the application of power to a non-consumable tungsten electrode along with flow of shielding gas. As described below, the stud welding processes may include application of direct current or alternating current power, or various waveforms, to the studs to create an electrical arc and to fuse the materials of the stud and the workpiece to securely fix the studs to the workpiece. The stud welding processes may be adapted to utilize certain of the characteristics of the other processes implemented by the power supply, such as pulsed welding, as discussed below.

The power supply 12 further includes interface circuitry 34 designed to communicate with similar interface circuitry 36 of the stud welding gun 14. This interface circuitry may communicate welding commands (for initiation or termination of a welding operation), welding parameters (e.g., currents and voltages), and so forth between these components. The interface circuitry may communicate via dedicated cables, such as terminated through conventional multi-pin connectors, or communication may be wireless or over a weld cable 38 that conveys power from the power conversion circuitry to the stud welding gun 14. As in other welding applications, the power conversion circuitry also completes the welding circuit via a work lead 42 that is typically attached to the workpiece or to fixture in which the workpiece is positioned via a clamp 44.

The stud welding gun 14, in addition to the interface circuitry 36, may include control circuitry 46 which may control various operations of the gun. The control circuitry will typically include a microprocessor, digital signal processor or other processing circuitry associated with memory (not separately shown). By way of example, the control circuitry may regulate the application of power from the power conversion circuitry 22 to an electrode that will be in contact with each stud being placed. This control may be initiated, for example, by a trigger or other operator-controllable device, not shown in FIG. 1. The control circuitry, moreover, may control certain operations automatically, such as for the application of power for the welding operation based upon proper placement and orientation of the stud as discussed below. Still further, the control circuitry may regulate certain motion devices in the stud welding gun, such as a stud feed motor 50. In a presently contemplated embodiment a feed system is implemented via a motor 50 that can draw studs from a pre-configured magazine 52. It is contemplated that the magazine may be configured similar to conventional nail gun charges in which a support 54 holds studs 16 to be welded. The support may take any suitable form, such as paper, plastic film, or the like. The magazine is drawn into the gun under the power of the stud feed motor 50 and indexed into position for loading into a chuck 56 similar to those found in conventional stud welding guns. The chuck may be opened and closed under the power of a separate motor, such as a standoff/stud advance motor 58. This motor may also be controlled by the motor drive circuitry 48 and allows for open and closing of the chuck, advancing of the stud to be welded toward the workpiece, and eventual placement of the stud at the weld location. Other motion devices can also be controlled within the gun, such as for separately opening and closing the chuck 56, for raising and lowering one or more shields as discussed below, and so forth. It should be noted, however, that to lighten the stud welding gun 14, certain of these motors may be replaced by valving for compressed gas, compressed air and the like that accomplish the desired motions by rotation or reciprocation of springs, piezoelectric linear motors, solenoids, or linear actuators (e.g., pneumatic cylinders). The operation of these actuators may, in such cases, be controlled by the control circuitry 46.

The stud welding gun illustrated in FIG. 1 further includes devices for detecting, displaying and controlling the orientation of the stud welding gun. In particular, in many applications desired angles will be dictated for placement of the studs, in most applications the angular orientation will perpendicular to the workpiece surface. According to the stud welding gun illustrated includes one or more orientation sensors 60, which may comprise accelerometers, solid state gyroscopic devices, MEMS devices, or any other suitable orientation-sensitive devices. The orientation sensor 60 may provide signals to control circuitry 46 which converts these signals to two-dimensional or three-dimensional data representative of the orientation and/or placement of the welding gun and particularly of the stud charged in the chuck. The control circuitry may then be coupled to orientation readout circuitry 62 which may provide a user with numeric position information, orientation information, and so forth. In certain embodiments, the orientation information may be recorded either in the welding gun or in the power supply (or in any device coupled to these), for recordation of the parameters of the welding operation and quality control. Still further, the illustrated welding gun includes a display 64 adapted to display, in a graphical manner, the orientation of the welding gun 14 and/or the stud 16. Various physical configurations of these displays are envisaged, as discussed in greater detail below. However, the display will ideally provide a simple and intuitive graphical feedback of the orientation, allowing the welding operator to properly orient the gun for the appropriate positioning of the stud (e.g., perpendicularity).

It should be noted that, although a manual system is described and illustrated in FIG. 1, the system may be partially or fully automated as well. That is, the welding gun 14 may be adapted for mounting in an automated system (e.g., a robot) for placement and welding of the studs. It is presently contemplated that such robots may be located at or near locations where many studs would be placed, and three-dimensional data may be stored in the robot corresponding to placement of the individual studs. Thus, in contrast to conventional systems where careful marking is required, followed by human operator placement of the studs, automated placement may at least partially or completely obviate the need for marking, and greatly enhance the efficiency of the stud welding operation once the robot is properly located and "zeroed" to provide a reference point for placement of the individual studs. Such automation may also allow for enhanced control of the angular orientation of the studs with respect to the workpiece or surface, even for out-of-position welding of the studs.

Figure 2:
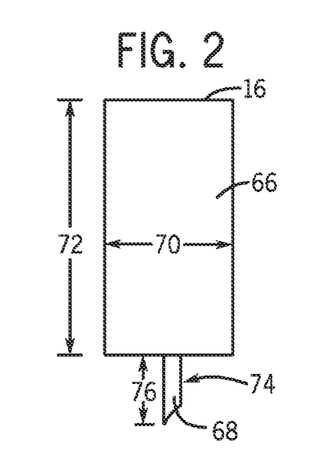
FIGS. 2-8 are exemplary configurations for studs that may be used in the system.

FIGS. 2-8 represent exemplary stud configurations presently contemplated for use with the stud welding system. As illustrated in FIG. 2, the stud 16 includes a stud body 66 and a standoff electrode or "bridge wire" 68. The body of the stud may be plain, threaded, or may have any other physical configuration desired for the application. In general, the stud will be specified by size, including diameter 70 and length 72, while the bridge wire may be specified by its diameter 74 and length 76. Although an angled tip is illustrated for the stud wire 68 in FIG. 2, various configurations of bridge wires or other electrodes may be envisaged. Moreover, the stud and bridge wire may be formed by any suitable process, such as by a turning operation, stamping, forming, and so forth, in which the bridge wire is made of the same material as the stud body 66. As discussed below, other manufacturing techniques may provide for different materials of the electrode and stud body. It is presently contemplated that the bridge wire 68 essentially functions as or mimics a welding wire in a conventional MIG process. Thus, the welding process implemented for welding the stud may be based upon the algorithms for MIG welding, in which the bridge wire is melted or vaporized and an arc is initiated by contact or proximity of the wire with the workpiece without retracting the stud as in current stud welding applications. Presently contemplated diameters for the bridge wire may extend between 0.023 inches and 0.125 inches, although other sizes may be used. A smaller diameter wire or extension of small cross sectional area may allow for lower current to be used for arc initiation. The length of the bridge wire is selected based upon the length of the arc desired between the base material and the stud. This length will be selected so as to establish and maintain a suitable arc while also avoiding reconnecting of the base material with the stud prematurely. Presently contemplated lengths are between 0.2 inches and 0.5 inches, although other lengths may be used. It is also presently contemplated that a sharp or relatively sharp tip on the bridge wire may facilitate initiation of the welding arc.

It should be noted that the use of such electrodes in combination with studs may provide process enhancements and weight reductions that offer significant advantage over conventional processes. For example, the power circuitry used need not provide power to drive a retracting mechanism for retracing the stud following establishment of the arc, this correct position being provided by the bridge wire. A further advantage resides in the reduction of cabling, power, and processing needed in for placement and advancement of the stud during the process. Moreover, once the bridge wire is melted and/or vaporized, utilizing starting currents common in other welding processes, such as MIG welding, currents similar to common welding (on the order of 100-500 A) may be utilized for stud welding, as opposed to much higher currents on the order of 800 A in conventional stud welding systems. As described in greater detail below, the presently contemplated embodiments incorporate a "hold time" for melting of the stud base and workpiece surface once the arc is established by virtue of the bridge wire. This hold time may be somewhat longer than in conventional stud welding systems, and power may be interrupted before, during or shortly after advancement of the stud towards the base material. In particular, currents may be limited as the stud is advanced towards the base material for the final placement infusion of the materials.

Figure 3:
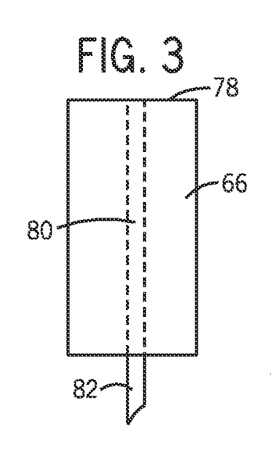
Figure 4:
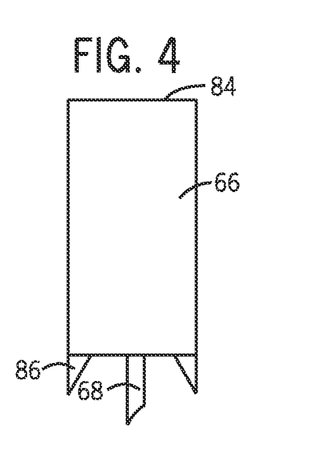

In the illustration of FIG. 3, a stud 78 includes a passageway 80 formed to receive a bridge wire or electrode 82. The body 66 in this embodiment may be formed by a turning or extruding operation, with extrusion being convenient when the passageway 80 runs completely through the body 66. Alternatively, a recess may be formed in the stud body such that passageway 80 extends only partially into the body. This configuration may be useful for applications where a different material is used for the bridge wire or electrode 82 and for the body 66. In particular, many applications may require studs to be mounted on and welded to special materials, such as aluminum and tungsten alloys, copper alloys, and specialty steels. The stud body, to provide good fusion with these materials, may also be made of these materials, although this adds substantially to the cost of the studs. Accordingly, it is contemplated that electrodes 82 may be used to enhance the fusion between the studs and the base material, particularly where more special or expensive base materials are utilized. This may permit lower cost studs to be mounted on these materials. By way of example, studs made of carbon steel or other alloys may include bridge wires or electrodes made of specially formulated alloys to facilitate fusion with base materials (e.g., made of titanium and titanium alloys, HSLA 80 or 110 steels, etc.).

Other stud designs are illustrated in FIGS. 4-7 that may utilize electrodes, standoffs or wires of different configurations, styles and positions. For example, the stud 84 illustrated in FIG. 4 has a stud body 66 and bridge wire 68, but also includes lateral projections 86. It is contemplated that such shapes may assist in nugget formation or otherwise optimize the weld pool penetration and/or distribution. That is, a plasma arc will tend to follow the path of least resistance. Features of the type illustrated in the figures may be used to favor one area of the stud. Raised lateral extensions or ridges 86 on outer edge of the stud may tend to move the arc to the outer edge, accommodating a wider weld nugget.

Figure 5:
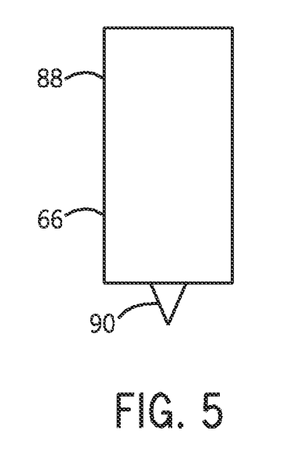

Studs 88 of the type illustrated in FIG. 5 may be machined as described above such that a thicker or wider bridge wire or electrode element 90 is provided. Ideally, an area that is easily melted or vaporized will be used. Thus, a stud having a point may be sufficient for use as a surrogate wire or electrode. The point may be small enough in diameter (large enough in resistance) that excessive currents are not required to melt and/or vaporize it. The shape, length and resistance of the bridge wire or point may be matched to the response of the power supply such that the process initiates the arc every time and transitions into the weld state without arc outages or short circuits.

Figure 6:
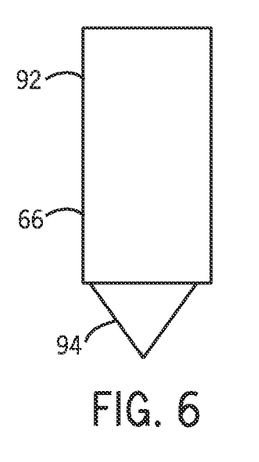

Studs 92 of the type shown in FIG. 6 are similar, but may include a larger or deeper extension 94 for arc initiation. In this case, the end of the stud includes an extension that is generally conical or triangular in shape and centrally placed. Such arrangements may tend to concentrate the arc at the center of the stud. This may be useful to focus the arc to the center and promote deeper penetration into the base material.

Figure 7:
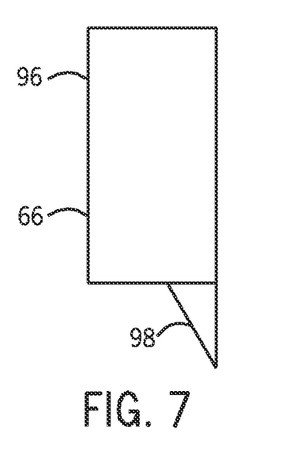

Still further, a stud 96 of the type illustrated in FIG. 7 may be used in which an off-set extension 98 is provided. A raised area such as the extension 98 may favor one side of the stud, tending to force most of the arc to that side. This may facilitate positioning of the weld nugget in out-of-position welds. In such cases, the stud welding gun may be properly oriented (manually or robotically) such that the extension mates with the chuck as required to properly orient the extension, or the welding gun or robot-mounted arrangement may be rotated to provide this desired orientation.

Figure 8:
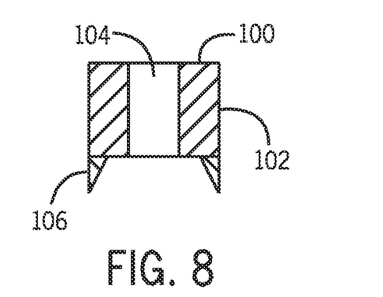

Finally, a stud 100 of the type as shown in FIG. 8 may include a hollow body 102 traversed by a central or off-set aperture 104, which may be threaded (e.g., commonly referred to as a "weld nut"). In such cases, an annular or multiple extensions 106 may be provided raised from the bottom of the stud to initiate arcs.

It should be noted that the use of an extension, such as a bridge wire on the studs is believed to be particularly useful for initiating welding arcs. In general, it would be desired that the bridge wire or electrode is electrically charged or "hot" as it comes into contact or approaches the base material. That is, when the first point or points of the bridge wire or electrode contact or come into close proximity with the base material, current will begin to flow, establishing the arc. If, by way of example, the power supply provides a current at relatively fast rate, on the order of 600 A/ms or faster, the first point or points of contact may be vaporized nearly instantaneously. To use this phenomenon, the stud may be held up, recessed into the welding gun, surrounded by a nozzle or standoff as described below. When the stud is first advanced forward, then, this may be at a relatively slow rate (e.g., less than 1 inch/s). This will facilitate the initiation of the arc. Thus, the process may make use of two advancement steps as described below, one for arc initiation and maintenance, and a second for plunging in which the stud is fixed in the weld pool and fused to the base material.

It should also be noted that alternative techniques may be employed for initiating the arc for the stud welding process. For example, high frequency arc starters may be used, that may be incorporated into the power supply, the stud welding gun, or into another component. As will be appreciated by those skilled in the art, such devices are used in other, unrelated processes, such as TIG welding. They may produce a high frequency, high voltage pulsation that is capable of initiating arcs across extended air gaps. An example of one such device is available from Miller Electric Mfg. of Appleton, Wis., under the designation HF 250. In such cases, it may be useful to provide a very sharp tip on the base of the stud, as described below, to aid in initiating the arc. Still further, short bursts of current may be applied to initiate the arc. Moreover, so-called "pilot arcs" may be used, in which a low energy arc is initiated and maintained until substantial heating is desired, at which time current levels are substantially increased to melt the stud and the workpiece.

FIGS. 9-12 illustrate, diagrammatically, the placement and welding of a stud 16 to a workpiece 18 in accordance with presently contemplated embodiments. As discussed above, the power supply or welding gun may be adapted for input of certain parameters used to control this process, such as the stud size, the stud style, the stud type, base material thicknesses, alloy type, shielding gas type, and so forth. Alternatively, the system may automatically sense these variables and automatically configure the system to match them. Such automatic sensing may be performed, for example, in accordance with known techniques, such as based upon marking on the studs or the stud support, particularly where a magazine, role, or other stud holding system is utilized. As illustrated in FIGS. 9-12, in a presently contemplated embodiment, no ferrule is utilized as is in prior art stud welding systems. Rather, the stud 16 may be at least partially surrounded by a nozzle or standoff 108 that allows shielding gas to be circulated around the stud, and that may define the position of the stud for initial arc initiation or subsequent positioning. That is, the nozzle or standoff may extend from the welding gun and project a desired amount from the lower surface of the stud, and/or below the lower extremity of the electrode. In certain embodiments, it is contemplated that the electrode or bridge wire will extend beyond the nozzle or standoff 108, at least initially.

Figure 9:
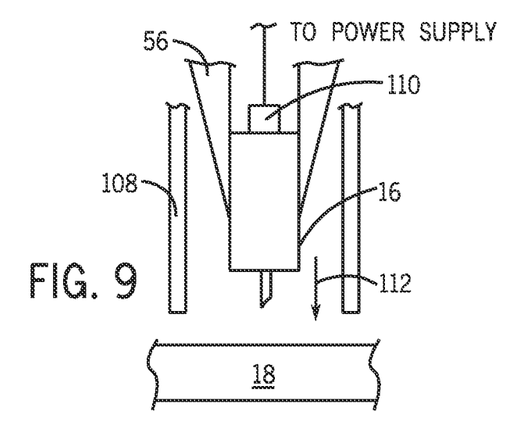
FIGS. 9-12 are diagrammatical representations of steps in the placement in welding of a stud in accordance with the present techniques.

In the illustration of FIGS. 9-12, a stop 110 is illustrated in contact with a rear or top of the stud 16. In practice, this may also serve as an electrical contact for charging the stud for establishment of the welding arc. Alternatively, electrical power may be provided through the chuck 56. In the illustration of FIG. 9, the stud welding gun holds a stud in place for positioning and application of current. The nozzle or standoff 108 allows for gas coverage surrounding the weld area to protect the area with welding shielding gas, such as $CO_2$ or a high argon mixture. The nozzle can also serve as a standoff setting mechanism as illustrated. It should be clear, however, that these two functions may be separated, and other standoffs or positioning devices may also be utilized. In the illustrated embodiment, initially the bridge wire extends past the standoff setting mechanism by approximately 25% of its total distance, or about 0.1 to 0.2 inches. This ensures that the bridge wire will make contact with the base material. When the stud and gun are brought into place against the base material, the stud held by the chuck against the stop 110 may be pushed back into the gun by a small distance as these are advanced or lowered as indicated by arrow 112.

Figure 10:
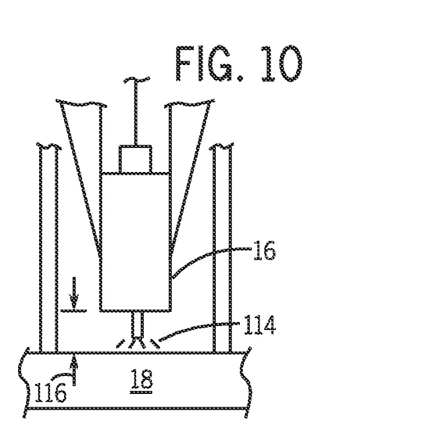
Figure 11:
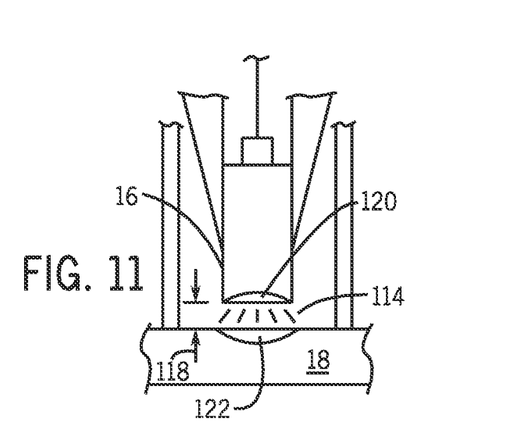

As illustrated in FIG. 10, once the stud is in electrical contact with the base material, and the stud is correctly aligned, a welding current may be applied to initiate the welding arc 114. This may occur, for example, upon the activation of a trigger or switch by the operator, or automatically, based upon sensed alignment and/or gun orientation. In a presently contemplated embodiment, a relatively high current level, such as greater than 400 A may be applied to melt and/or vaporize the bridge wire for a desired time, such as on the order of 0.05 to 0.5 seconds. This creates an arc between the stud and base material as indicated in FIG. 11. As noted above, alternative techniques may be employed for initiating the arc, such as the use of high frequency arc starters, pilot arcs, and so forth. Thereafter, the current may be reduced to a lower level, and may be held at the lower level for a desired amount of time, such as on the order of 0.1 to 5 seconds, depending upon the current level. Moreover, the stud may be held in a desired place or elevation while welding current is applied. This causes melting of the stud and base material sufficient for the welding operation. In the illustration of FIG. 11, a height of 118 is maintained during this holding phase, and regions 120 and 122 of the stud and base material, respectively, are melted.

Figure 12:
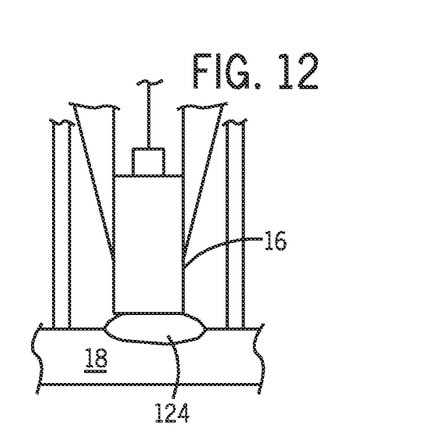

Following preparation of the materials under the heat of the welding arc, the stud may be plunged or advanced into place to fuse the materials as illustrated in FIG. 12. At this point, the welding current may be greatly reduced terminated to extinguish the arc. This termination may occur just prior to the advancement of the stud, during advancement of the stud, or various control regimes for the power applied to the stud may be implemented, such as based on pulsed technology. The weld nugget 124 is thus formed between the base material and the stud 16.

Figure 13:
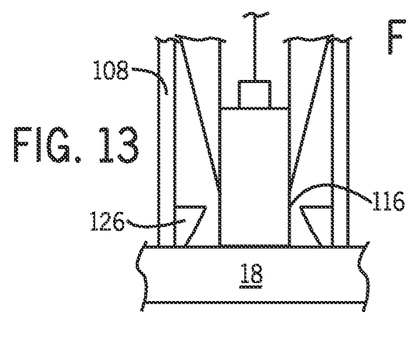
FIG. 13 is a similar diagrammatical representation of a stud with a surrounding ferrule secured in the stud welding gun.

A range of alternative configurations may be envisioned, for both the standoff and nozzle arrangement, and the spacing devices used for placement and location of the studs. FIG. 13 illustrates one exemplary alternative configuration in which a ring or ferrule 126 is attached to the nozzle 108. In certain embodiments, this ring structure may be a cooled, thick copper shell in place of a ferrule to hold the weld puddle in place and to contain the shielding gas or flux. Various materials may be used that have high temperature capabilities such as ceramics, tungsten, graphite and so forth. It is contemplated that such structures may be used repeatedly for many welds before replacement. Here again, the absence of any separate stud-attached ferrules avoids the cost and the cleanup associated with such devices.

Figure 14:
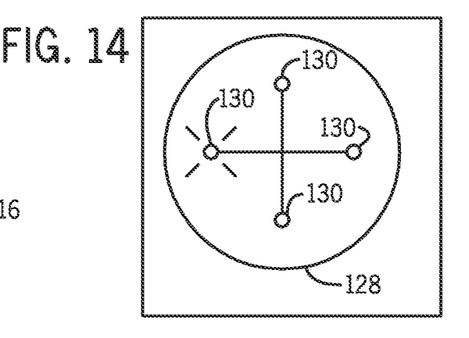
FIG. 14 is a representation of an exemplary orientation display that may be use in a stud welding gun to provide feedback of the stud perpendicularity.

As discussed above, it is presently contemplated that the stud welding gun may be equipped with one or more orientation sensing devices and a graphical presentation of the orientation of the gun, such that an operator may properly align or tilt the gun for the desired stud attachment angle. FIG. 14 represents an exemplary display 128 comprising a series of orthogonally positioned LEDs 130. Based upon the sensed orientation of the welding gun, one or more of these LEDs may be lit to indicate to the operator that the gun needs to be moved away from the lit LED to obtain proper orientation (e.g., verticality). Other similar displays may include a series of LEDs, LCDs, or graphical displays, such as in lines, lights arranged in concentric rings such as a target, and so forth.

Figure 15:
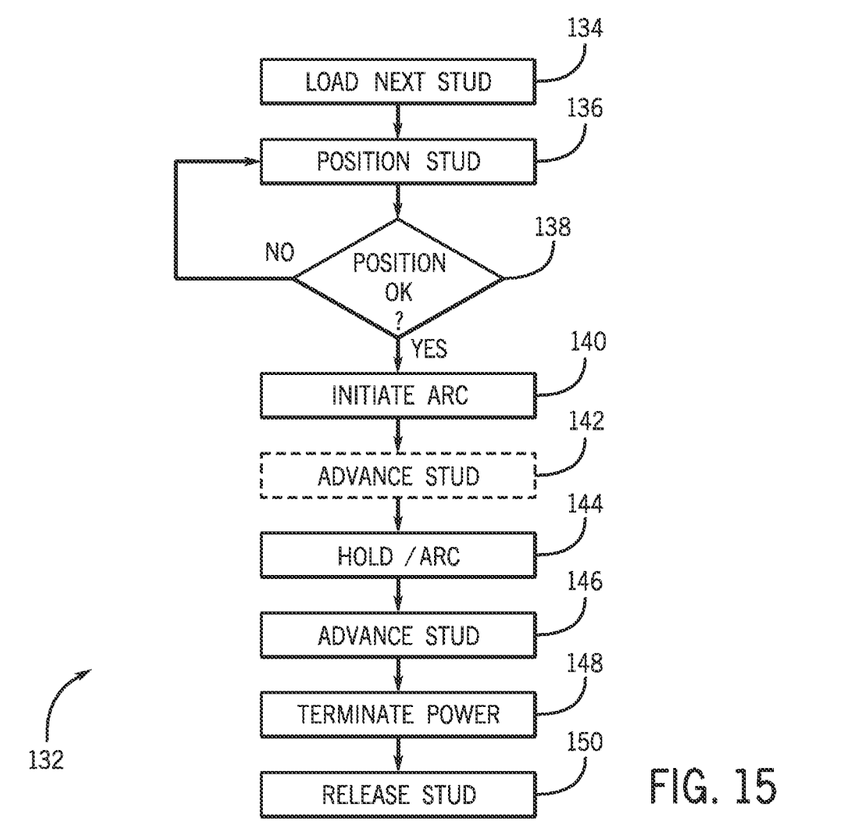
FIG. 15 is a flow chart illustrating exemplary logic for performing a stud welding operation in accordance with the present disclosure.

FIG. 15 illustrates steps in exemplary logic for a stud welding operation in accordance with the present techniques. The stud welding operation 132 begins with loading of a stud at step 134. As noted above, this may be done from a magazine or strip-type arrangement, or may also be performed from a canister or other holder in an automated fashion. Alternatively, the studs may be loaded by hand as in conventional stud welding guns. At step 136 the stud and gun are positioned at the desired location. At this point a readout and/or graphical representation of the orientation may be provided to an operator for recordation and correction. If the position is not proper, as noted at block 138, the stud and/or gun may need repositioning. Once the positioning is proper, the welding operation may advance. As noted above, the positioning may be performed manually, or automated mechanisms may be used for the process. In particular, it is presently contemplated that one or more robots may assist in appropriately locating the studs on the base material surface and orienting the studs properly according to the weld specifications.

The actual welding operation begins at step 140 where an initial arc is developed, such as between the bridge wire or other electrode extension of the stud and the workpiece surface. Here again, the arc may be initiated by application of an elevated voltage and current, or generally known welding processes, such as welding pulses, high frequency starting, and/or pilot arc starting may be employed to initiate the arc. At step 142, optionally, the stud may be advanced following initiation of the arc. This may be performed in order to position the stud at a desired elevation above the workpiece surface as described above. At step 144 the arrangement is held in place, or advanced, and the arc is continued. It is also noted above, at this stage a reduced current may be used to maintain the arc and to at least partially melt the stud and workpiece for the desired weld. Moreover, if other welding regimes, such as pulsed welding are employed, the pulses may be adapted for arc maintenance and avoid unwanted spatter, discharges, spray, and so forth. After the hold time, then, the stud may be advanced as indicated at step 144. As noted above, this may be performed by a motor, or other actuator within the stud welding gun. In other contemplated arrangements, one or more springs may be pre-charged, such as a solenoid, and released upon deactivation of the solenoid to plunge the stud into place and complete the weld. At step 148, immediately prior to advancing the stud, or with the advancement of the stud power may be terminated. Once the stud is welded in place, then, the stud may be released from the gun as indicated at step 150.

Figure 16:
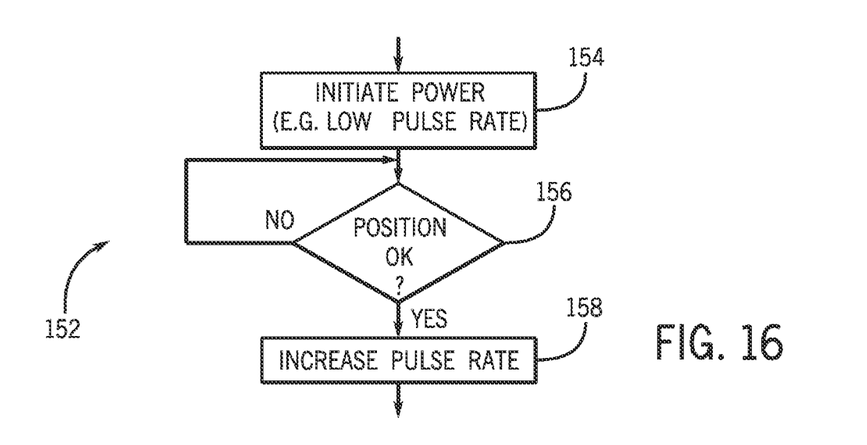
FIG. 16 is a similar flow chart illustrating alternative logic that may be used in the process.

FIG. 16 represents several steps in logic for automatic initiation of the stud welding process. These automatic steps, indicated by reference numerals 152, begin with initiation of power, such as via a low pulse rate in a pulsed regime as indicated by step 154. In general, step 154 may follow the step of holding the stud discussed above. As indicated at step 156, the system may automatically determine whether the position of the stud is as desired, based upon feedback from the position sensors. With the low power applied at step 154, then, once the position is as desired, the system may automatically advance the stud, increase the pulse rate or power applied to the stud, or make other process changes, as indicated at step 158. This process allows for ease of initiation of the process, and may implement a delay until the desired position is obtained.

The foregoing systems, consumables and methods may be subject to many different alternatives and improvements. For example, regarding the process utilized, the use of alternating current or different polarities of welding power to increase and/or decrease the heat on the base and/or the stud may be considered. The negative/positive ratio may be adjustable within a full range of adjustments between 0 and 100 percent. Moreover, the frequency and duty cycle of wave shapes may be adjustable. This may have the benefit of matching the penetration into the base material to its thickness. Similarly, the welding power regime selected may be adapted depending upon the orientation of the stud and workpiece. For example, certain pulse regimes may be better suited for out-of-position welding, or the regime may be altered in such cases.

Moreover, regarding the orientation and advancement of the stud, the stud advancement mechanism may be designed for attachment to conventional welding equipment, such as a MIG wire feeder. That is, the MIG wire gun may be disconnected in such applications and replaced with a stud gun. In this manner, all of the upstream equipment may serve for both processes, reducing inventory, costs, cabling, time and space requirements. The MIG wire feeder may provide a good connection point for power, shielding gas and offers a user interface for adjustment of process parameters. Alternatively, both a MIG gun and a stud gun may be connected at all times to the power supply or wire feeder. Similarly, the stud gun may be utilized with other common welding system types, such as TIG welders and stick welders. Still further, the orientation sensing stud gun described above may be equipped with sensing mechanisms to have different orientation then its normal connection to the body of the gun or may have redundant sensors such that the sensors are positioned in a gravitational field that allows for highest resolution. That is, in some orientations, relative to gravity, some sensors may have less resolution in certain orientations and may require an alternative orientation to supply sufficient accuracy.

For advancement of the studs, various mechanisms and spring arrangements may be envisaged. In one simple arrangement, a spring may be engaged and preloaded when the next stud is loaded into the chuck either manually or automatically. The stud may be held in a chuck that has a side spring force to firmly hold the stud. The stud bottoms out against the stop discussed above to ensure proper spacing. The chuck may serve as the component that carries welding current, as discussed above. In such arrangements, following the desired weld time, the spring may be released and the stud plunged to the weld. It is also contemplated that arrangements may be employed, such as springs in cooperation with dampening devices, that may provide for a slow, continuous advance of the stud during the welding process. These may also be closed-loop, and distance or position of the stud and/or stud welding gun could be sensed for feedback control, such as through the use of sensors, such as laser triangulation systems. Where slow advancement of the studs is used, the rate of advancement may be adjustable, such as based on the size of the stud, the thickness of the workpiece, the current applied, and so forth. Similarly, the welding power (e.g., current and voltage) applied may be varied based upon the relative distance of the stud from the workpiece, such as to maintain the arc while avoiding spatter and unwanted movement of molten material from the welding location.

Moreover, gun spacing means of various types may be provided. These will allow for positioning of the stud gun above the base material. As noted above, in certain arrangements a bridge wire may be used to initiate the arc. In some cases the bridge wire may be flexible and bend as the gun is pushed towards the base material. The bending of the bridge wire alone may provide sufficient force for connecting the stud to the base material. In other alternative, a small spring with minimal travel (e.g., approximately 10 to 50 percent of the length of the bridge wire) may be used with no releasing or triggering of the spring. That is, the spring may always be free and able to move within its compression range. The spring that advances the stud or weld nut to the base material has restricted movement while the nugget is formed. Once the time limit for welding is achieved, the spring may be allowed (released) to advance (slowly or in a plunge) the stud to the base material. In applications where the stud is positioned perpendicular to the earth's gravity, gravitation may be used in place of the small spring force but the stud will nevertheless be held in place while the stud and base material are melted. For example, the gun may have a free flowing travel (e.g., about 10-50 percent of the bridge wire length) and gravity may pull the stud to the base material while the stud will only travel approximately 10-50 percent of the distance of the bridge material.

Regarding the stud materials and configurations, as noted above, a range of such designs may be employed. In a further alternative, similar to running a wire through the center of the stud, welding wire may be routed around the outside of the component to be welded. In such cases, the component could be a stud or weld nut or any similar structure. The welding wire may consist of a single wire that is spun around the outside of the component or multiple wires that are stationary or are rotated some fraction of a fully annular coverage. This technique may provide for additional and wider fusion of the base material for a stronger connection.

Finally, various techniques may be envisaged for recovering from short circuit events should they occur during welding. As noted above, various welding processes may be employed, such as pulsed regimes, along with various material transfer modes. In one presently contemplated technique, current flow may be increased in the event that a short circuit is detected, similar to the response of a constant voltage welding power supply to clear the short. A subsequent extended weld time may be added to repeat or redo the weld. Moreover, a high current response may be employed with a means of sensing that the short is about to clear and then significantly reducing the power before the short clears, thereby reducing the amount of power at the point at which the short clears, significantly reducing the amount of material that may be expelled from the weld joint. Such techniques are used in different contexts, such as for short clearing in pulsed and short circuit welding processes. Still further, the short circuits may be sensed (such as by reference to increasing currents or falling voltages) and the stud may be retracted away from the base material, this will typically allow the current to remain at a low level while re-establishing the arc.

In all of these techniques, it is important to note that various parameters may be sensed and stored by the welding system and/or remotely coupled monitoring and/or control equipment. In certain applications this may allow for record keeping and quality control on a stud-by-stud basis.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A stud welding system, comprising:
   a power supply configured to perform a stud welding process and at least one other welding process, the power supply comprising control circuitry for executing the stud welding process and the at least one other welding process, and power conversion circuitry configured to output power suitable for a selected one of the welding processes; and
   a stud welding gun configured to receive the output power from the power supply and to perform a stud welding process of studs to a workpiece, wherein an arc is initiated between an arc-initiating extension extending from each of the studs and the workpiece during the stud welding process, and wherein the stud welding gun comprises control circuitry configured to control movement of each of the studs toward the workpiece in a single direction without retraction of the studs during the stud welding process.

2. The stud welding system of claim 1, wherein the stud welding gun comprises an orientation sensor for detecting an angular orientation of the stud welding gun or a stud loaded in the stud welding gun for welding to the workpiece.

3. The stud welding system of claim 2, wherein the stud welding gun comprises a readout configured to provide an operator perceptible indication of orientation of the stud welding gun or the stud.

4. The stud welding system of claim 2, wherein the stud welding gun comprises a light display configured to provide an operator perceptible indication of orientation of the stud welding gun or the stud.

5. The stud welding system of claim 1, wherein the stud welding gun comprises a nozzle or standoff configured to space a stud to be welded at a desired location with respect to the workpiece and to automatically sense or control the spacing.

6. The stud welding system of claim 1, wherein the power supply is configured to perform stud welding based upon a pulsed welding regime.

7. The stud welding system of claim 1, wherein the stud welding gun is coupled to an automation system for positioning the stud welding gun at a desired location and orientation for welding of studs to the workpiece.

8. A method for stud welding, comprising:
    loading a stud in a stud welding gun, the stud having a body and an arc-initiating extension;
    positioning the stud welding gun at a desired location with respect to a workpiece with the arc-initiating extension contacting or closely proximate the workpiece;
    initiating a welding arc between the arc-initiating extension and the workpiece;
    holding the stud away from the workpiece for a desired time while maintaining the welding arc between the stud and the workpiece; and
    advancing the stud toward the workpiece in a single direction without retraction of the stud to join the stud to the workpiece.

9. The method of claim 8, comprising detecting a position or orientation of the stud welding gun or the stud.

10. The method of claim 9, comprising displaying a user viewable indication of the position or orientation of the stud welding gun or the stud.

11. The method of claim 9, comprising automatically initiating the welding arc when the position or orientation of the stud welding gun or the stud reach a desired position or orientation.

12. The method of claim 8, wherein the stud welding gun is positioned at the desired location by an automated system.

13. The method of claim 8, comprising applying a first current to the stud to initiate the welding arc, then applying a second, lower current to the stud following initiation of the welding arc.

14. The method of claim 13, wherein the first current is higher than about 400 A.

15. The method of claim 14, wherein the first current is applied at a high frequency to initiate the welding arc.

16. The method of claim 13, wherein the second, lower current is lower than about 400 A.

17. The method of claim 16, wherein the second, lower current is lower than about 100 A.

18. The method of claim 8, comprising advancing the stud to a desired proximity to the workpiece following initiation of the welding arc and before or during the step of holding the stud away from the workpiece.

19. The method of claim 8, wherein the stud is advanced at a slow rate following initiation of the welding arc.

20. The method of claim 8, comprising applying a shielding gas around the stud.

21. The method of claim 20, comprising confining the shielding gas via a nozzle or standoff of the stud welding gun.

22. The method of claim 8, wherein the welding arc is initiated and maintained by pulsed power from a welding power supply.

23. The method of claim 8, comprising logging the position or orientation of the stud welding gun or the stud during welding of the stud to the workpiece.

24. The method of claim 8, comprising logging at least one welding parameter during welding of the stud to the workpiece.

25. A stud welding system, comprising:
    a power supply configured to perform a stud welding process and at least one other welding process, the power supply comprising control circuitry for executing the stud welding process and the at least one other welding process, and power conversion circuitry configured to output power suitable for a selected one of the welding processes;
    a stud welding gun configured to receive the output power from the power supply and to perform a stud welding process of studs to a workpiece, wherein an arc is initiated between an arc-initiating extension extending from each of the studs and the workpiece during the stud welding process; and
    an automation system for positioning the stud welding gun at a desired location and orientation for welding of studs to the workpiece, wherein the automation system is configured to control movement of each of the studs toward the workpiece in a single direction without retraction of the studs during the stud welding process.

* * * * *